US011828293B2

(12) United States Patent
Okada et al.

(10) Patent No.: US 11,828,293 B2
(45) Date of Patent: Nov. 28, 2023

(54) CLOSED IMPELLER AND METHOD OF MANUFACTURING THE SAME (71) Applicants: DAIKIN INDUSTRIES, LTD., Osaka (JP); UACJ Corporation, Tokyo (JP)

(72) Inventors: Tadashi Okada, Osaka (JP); Kosuke Nishimura, Osaka (JP); Kaoru Ueda, Aichi (JP); Yasunaga Itoh, Aichi (JP)

(73) Assignees: DAIKIN INDUSTRIES, LTD, Osaka (JP); UACJ CORPORATION, Tokyo (JP)

( * ) Notice: Subject to any disclaimer, the term of this patent is extended or adjusted under 35 U.S.C. 154(b) by 232 days.

(21) Appl. No.: 17/311,737

(22) PCT Filed: Nov. 26, 2019

(86) PCT No.: PCT/JP2019/046046
§ 371 (c)(1),
(2) Date: Jun. 8, 2021

(87) PCT Pub. No.: WO2020/121795
PCT Pub. Date: Jun. 18, 2020

(65) Prior Publication Data
US 2022/0025898 A1  Jan. 27, 2022

(30) Foreign Application Priority Data

Dec. 10, 2018  (JP) ................. 2018-231031

(51) Int. Cl.
*F04D 29/28* (2006.01)
*B23K 1/00* (2006.01)
(Continued)

(52) U.S. Cl.
CPC ............ *F04D 29/28* (2013.01); *B23K 1/0008* (2013.01); *B23K 35/0238* (2013.01); *B23K 35/286* (2013.01); *C22C 21/02* (2013.01)

(58) Field of Classification Search
CPC ...... F04D 29/28; F04D 29/284; B23K 1/0008
See application file for complete search history.

(56) References Cited

U.S. PATENT DOCUMENTS 6,146,094 A     11/2000 Obana et al.
9,903,385 B2 *   2/2018 Kawanishi ............ F04D 29/601
(Continued)

FOREIGN PATENT DOCUMENTS

CN    1970213 A      5/2007
CN    101934405 A    1/2011
(Continued)

OTHER PUBLICATIONS

Extended European Search Report from the European Patent Office dated Jan. 7, 2022 in related application No. EP 19 895 620.3, including European Search Opinion and examined claims 1-12.
(Continued)

Primary Examiner — Long T Tran
(74) Attorney, Agent, or Firm — J-TEK LAW PLLC; Jeffrey D. Tekanic; Scott T. Wakeman (57) ABSTRACT A closed impeller (1) includes an impeller main body (2), which is composed of an aluminum alloy and has blades (22) that protrude from a hub (21). A shroud (3) covers the blades. The blades and the shroud are joined together by brazed joints (4). The shroud (3) is formed from a brazing sheet (30) that comprises a core material (31), which is composed of an aluminum alloy, and a filler material layer (320), which is disposed on an outermost surface (33) of the shroud that opposes or faces the blades when the shroud is brazed to the blades.

18 Claims, 4 Drawing Sheets (51) Int. Cl.
*B23K 35/02* (2006.01)
*B23K 35/28* (2006.01)
*C22C 21/02* (2006.01)

(56) References Cited

U.S. PATENT DOCUMENTS

| | | | | |
|---|---|---|---|---|
| 2007/0147999 | A1* | 6/2007 | Feher | F04D 29/284 |
| | | | | 416/186 R |
| 2010/0189568 | A1* | 7/2010 | Watanabe | B23K 1/0018 |
| | | | | 29/889 |
| 2011/0142653 | A1* | 6/2011 | Hagshenas | B23P 15/006 |
| | | | | 29/889.4 |
| 2011/0318183 | A1* | 12/2011 | Noronha | B23P 15/006 |
| | | | | 416/189 |
| 2012/0117803 | A1 | 5/2012 | Niihara et al. | |
| 2012/0141261 | A1* | 6/2012 | Giovannetti | F04D 29/2227 |
| | | | | 415/203 |
| 2013/0078099 | A1 | 3/2013 | Ahn | |
| 2017/0151637 | A1 | 6/2017 | Ichikawa et al. | |
| 2017/0260997 | A1* | 9/2017 | Mola | B22F 12/60 |
| 2017/0320170 | A1 | 11/2017 | Yanagawa et al. | |
| 2018/0214964 | A1 | 8/2018 | Itoh et al. | |
| 2019/0011030 | A1* | 1/2019 | Kawahara | F16H 41/28 |
| 2019/0184501 | A1 | 6/2019 | Fukumoto et al. | |
| 2019/0291218 | A1 | 9/2019 | Itoh et al. | |
| 2020/0061758 | A1 | 2/2020 | Itoh et al. | |
| 2021/0048037 | A1* | 2/2021 | Siefring | F04D 29/284 |

FOREIGN PATENT DOCUMENTS

| | | | |
|---|---|---|---|
| CN | 103008902 | A | 4/2013 |
| EP | 0890745 | A2 | 1/1999 |
| EP | 2639460 | A1 | 9/2013 |
| JP | H02-251393 | A | 10/1990 |
| JP | H1182379 | A | 3/1999 |
| JP | 2005138122 | A | 6/2005 |
| JP | 2010174652 | A | 8/2010 |
| JP | 2014077179 | A | 5/2014 |
| JP | 2016150355 | A | 8/2016 |
| JP | 2017029989 | A | 2/2017 |
| JP | 2017214610 | A | 12/2017 |
| JP | 2018035386 | A | 3/2018 |
| KR | 20150033441 | A | 4/2015 |
| WO | 9622854 | A1 | 8/1996 |

OTHER PUBLICATIONS

English translation of the International Search Report of the International Searching Authority dated Feb. 10, 2020 in parent International application No. PCT/JP2019/046046.

English translation of the Written Opinion of the International Searching Authority in parent International application No. PCT/JP2019/046046.

Office Action from the Chinese Patent Office dated Sep. 2, 2022 in related Chinese application No. 201980079735.9, and translation thereof.

Office Action from the Japanese Patent Office dated May 17, 2022, in related Japanese application No. 2018-231031, and machine translation thereof.

Office Action from the Chinese Patent Office dispatched Jun. 30, 2023 in counterpart Chinese application No. 201980079735.9, and translation thereof.

* cited by examiner

CLOSED IMPELLER AND METHOD OF MANUFACTURING THE SAME

CROSS-REFERENCE

This application is the US national stage of International Patent Application No. PCT/JP2019/046046 filed on Nov. 26, 2019, which claims priority to Japanese Patent Application No. 2018-231031 filed on Dec. 12, 2018.

TECHNICAL FIELD

The present invention relates to a closed impeller and a method of manufacturing the same.

BACKGROUND ART

For example, centrifugal compressors that comprise a casing, which has a suction port that suctions a fluid and a discharge port that discharges the fluid, and an impeller, which is held in a rotatable manner inside the casing, are used as compressors that are incorporated in air-conditioning apparatuses and the like. The impeller of a centrifugal compressor can, by rotating inside the casing, compress the fluid that has been suctioned in via the suction port and, while doing so, guide the fluid to the discharge port. As an example of this type of impeller, a closed impeller is known that comprises: a hub, which is held by the casing; blades, which protrude from the hub; and a shroud, which covers the blades. In a closed impeller, the space enclosed by the hub, the blades, and the shroud becomes passageways of the fluid.

Conventionally, a closed impeller is manufactured by cutting processes, precision castings, or brazing methods. In cutting processes, the hub, the blades, and the shroud are integrally formed by performing a cutting process on a metal slab. However, in this situation, because the range within which the cutting processes can be performed is constrained by the structure of the fabrication apparatus, tools, or the like, a closed impeller having a desired shape sometimes cannot be obtained.

There is a problem with precision castings in that, compared with cutting processes, although the constraints on the shape of the impeller are small, the accuracy of the dimensions is low. Consequently, there is a risk that a closed impeller obtained by precision casting will lead to a decrease in the operation efficiency of the centrifugal compressor. In addition, in the situation in which an attempt is made to manufacture a compact impeller having a diameter of, for example, 100 mm or less, there is a tendency for the mold material, such as plaster, to remain in the molten metal passageway after the casting. Furthermore, there is a problem in that this mold material is difficult to remove from the impeller, and thereby the manufacturing cost tends to become high.

In brazing methods, after the impeller main body, which is integrally formed with the hub and the blades, and the shroud are separately manufactured by machining or the like, the two are joined together by brazing. Consequently, compared with the situation in which the hub, the blades, and the shroud are integrally formed by a cutting process, constraints on the shape are small. Furthermore, because the impeller main body and the shroud are formed by machining, the dimensional accuracy of each part can be made higher compared with precision casting.

For example, in Patent Document 1, a technique is described in which, in a method of manufacturing an impeller comprising a substantially discoidal disk, a cover disposed opposing the disk, and blades provided between the disk and the cover, brazing is performed in the state in which the cover, the blades, and the disk are arranged in a specified manner.

PRIOR ART LITERATURE

Patent Documents

Patent Document 1
Japanese Laid-open Patent Publication 2010-174652

SUMMARY OF THE INVENTION

Aluminum alloys, which have a low specific gravity even among metals, are sometimes used as the metal that constitutes the impeller. When a closed impeller in which an aluminum alloy is used is to be manufactured using brazing, a method called dip brazing is used. In dip brazing, the impeller main body, which comprises the hub and the blades, and the shroud, which covers the blades, are manufactured in advance by machining or the like. Then, while interposing a filler-material paste, which contains a binder and a filler-material powder composed of an Al—Si-series alloy, between the blades and the shroud, the shroud is mounted on the impeller main body, and thereby an assembly is prepared. The impeller main body and the shroud are brazed to one another by immersing the assembly in a bath of melted flux. Brazed joints that include the filler material are formed between the blades and the shroud after the brazing.

Because the fluid compresses with high efficiency, the closed impeller rotates at high speed inside the casing. In addition, when the fluid inside the closed impeller is compressed, the pressure inside the closed impeller rises. Consequently, when manufacturing the closed impeller by brazing, it is necessary to make the joint strength of the brazed joints high.

However, in dip brazing, gas is generated by a reaction of the flux with the filler material, by thermal decomposition of the binder, etc. When this gas is incorporated into the filler that is melted during the brazing, bubbles form in the filler. For this reason, voids, which originate from the above-described gas, tend to form inside the filler material of the brazed joints formed by dip brazing. Consequently, with regard to a closed impeller that is composed of an aluminum alloy and is manufactured by brazing, there is a problem in that the joint strength between the blades and the shroud is lower than that of a closed impeller manufactured by a cutting process or precision casting.

It is one non-limiting object of the present teachings to disclose a closed impeller that can be manufactured by brazing and that has a higher joint strength between the blades and a shroud than in the past and a method of manufacturing the same.

In one aspect of the present teachings, a closed impeller comprises:

an impeller main body, which is composed of an aluminum alloy and comprises a hub part and blade parts that protrude from the hub part;

a shroud, which covers the blade parts; and brazed joints, which are interposed between the blade parts and the shroud and join the blade parts and the shroud;

wherein the shroud is a brazing sheet that comprises a core material, which is composed of an aluminum alloy, and a filler material layer, which is disposed on the core material and is present on an outermost surface opposing the blade parts.

In another aspect of the present teachings, a method of manufacturing the closed impeller according to the above-mentioned aspect, comprises:

preparing the impeller main body;

preparing the brazing sheet, which comprises: the core material composed of an aluminum alloy that contains Mg: 0.20 mass % or more and less than 1.80 mass %; and a filler-material layer, which is composed of an Al—Si-series alloy, has a thickness of 20-215 µm, and is disposed on the outermost surface;

preparing the shroud by performing forming work on the brazing sheet and disposing arranging) the filler-material layer on a surface opposing the blade parts; and brazing the surface of the shroud opposing the blade parts and the blade parts of the impeller main body in an inert gas without using flux.

The shroud of the above-mentioned closed impeller is a brazing sheet, comprising: the core material, which is composed of an aluminum alloy; and the filler material, which is present on the outermost surface opposing the above-mentioned blade parts, that is, the inner surface of the shroud. Furthermore, the blades of the impeller main body and the shroud are joined to one another via the brazed joints, which each comprise the filler material originating from the filler-material layer of the brazing sheet. Thus, by using the shroud, which consists of the brazing sheet, the joint strength of the brazed joints can be made higher than that of conventional brazed joints formed by dip brazing.

This point will now be explained in greater detail in accordance with the above-mentioned manufacturing method. In the above-mentioned manufacturing method, the impeller main body and the shroud, which consists of the above-mentioned specified brazing sheet, are separately prepared, after which the two are brazed without using flux. The filler-material layer of the brazing sheet is held on the core material. Consequently, in the above-mentioned manufacturing method, there is no need to use a binder to hold the filler material, as in dip brazing.

In addition, the core material of the brazing sheet, which constitutes the shroud, contains Mg. In the initial stage of brazing, Mg diffuses into the filler-material layer, and thereby moves to the surface of the shroud. In addition, after the brazing has progressed and the filler-material layer has melted, it elutes into the molten filler and moves to the surface of the shroud. Furthermore, by setting the amount of Mg in the core material and the thickness of the filler-material layer to the above-mentioned specified ranges, a sufficient amount of Mg is supplied to the surface of the shroud during heating when brazing is being performed, and thereby oxide films present on the surfaces of the shroud and the impeller main body can be broken down by the Mg. As a result, according to the above-mentioned manufacturing method, brazing can be performed without using flux.

As described above, in the manufacturing method according to the above-mentioned aspect, brazing can be performed without using a binder, flux, and the like, which are used in conventional dip brazing. For this reason, the formation of voids inside the brazed joints can be curtailed. Furthermore, the brazed joints formed after brazing are strengthened by the Mg that has diffused from the core material. As a result, the joint strength of the brazed joints can be made remarkably higher than that of the brazed joints formed by dip brazing.

DETAILED DESCRIPTION

An impeller main body of the above-mentioned closed impeller comprises a hub part and blade parts, which protrude from the hub part. The impeller main body is held by a rotary shaft of a centrifugal compressor and rotates, together with the rotary shaft, inside a casing of the centrifugal compressor. The hub part and the blade parts may be integrally formed by, for example, performing a cutting process on an aluminum-alloy slab. The shape of the hub part, the shape, number, and arrangement of the blade parts, and the like are not particularly limited and can be selected as appropriate in accordance with a desired compressing function or the like.

Alloys suited to the desired rotational speed, the compressing function, or the like can be used as the aluminum alloy that constitutes the impeller main body. The aluminum alloy that constitutes the impeller main body is preferably a JIS A6000-series alloy or an A7000-series alloy, which have comparatively high strength.

The blade parts of the impeller main body are covered by a shroud. The shroud of the closed impeller comprises a brazing sheet after brazing, that is, a core material, which is composed of an aluminum alloy, and a filler material, which is disposed on the core material and is present on an outermost surface that opposes the blade parts, that is, on an inner surface of the shroud. It is noted that the filler material of the shroud is formed by a portion of the molten filler, which is produced from the brazing sheet during heating when brazing is being performed, solidifying in the state in which that portion has remained on the surface of the core material.

The filler material of the shroud of the closed impeller, that is, the filler material after brazing, may be formed, for example, on the surface of the core material. In addition, as described below, in the situation in which the brazing sheet before brazing comprises an intermediate material between the core material and the filler material, the filler material may be formed on the surface of the intermediate material. In addition, the filler material should be present on at least the portions of the inner surface of the shroud that are joined to the blade parts. That is, the filler material of the closed impeller may be present in a layered manner over the entire inner surface of the shroud or may be present on portions of the inner surface.

As an example of the aluminum alloy that constitutes the core material, alloys, from among alloys that contain Mg, that are suited to the desired rotational speed, the compressing function, or the like can be used. The aluminum alloy that constitutes the core material is preferably a JIS A6000-series alloy or an A7000-series alloy, which have comparatively high strength. It is noted that examples of specific compositions of the core material are described below.

A brazed joint is interposed between each blade part and the shroud, and thereby the blade parts and the shroud are joined via the brazed joints. Here, "brazed joint" described above is a concept that includes the filler material that is filled between each blade part and the core material of the shroud and includes fillets that extend outward from the gaps between the blade parts and the core material of the shroud.

Each of the brazed joints preferably comprises a filler material composed of an aluminum alloy that contains Mg: 0.25 mass % or more. By setting the amount of Mg in the filler material of each of the brazed joints to the above-mentioned specified range, the filler material can be strengthened by the Mg. As a result, the joint strength of each of the brazed joints can be further increased. From the viewpoint of further increasing the joint strength of each of the brazed joints, the amount of Mg in the filler material of each of the brazed joints is more preferably 0.40 mass % or more.

The joint strength of each of the brazed joints is preferably 150 MPa or higher. By setting the joint strength of each of the brazed joints to the above-mentioned specified range, durability with respect to high-speed rotation, with respect to the rise in internal pressure due to compression of the fluid, and the like can be further improved. From the viewpoint of further improving this durability, the joint strength of each of the brazed joints is more preferably 170 MPa or higher and yet more preferably 200 MPa or higher.

The joint strength of each of the brazed joints is a value that is obtained by cutting out, from the closed impeller, a fragment that includes any of the brazed joints and the impeller main body and the shroud joined via that brazed joint, and then performing tensile testing on that fragment using a method that conforms to the stipulations of JIS Z2241:2011.

The above-mentioned closed impeller can be manufactured by the manufacturing method according to the above-mentioned aspect. In the manufacturing method of the above-mentioned aspect, the impeller main body is first prepared. As described above, the impeller main body can be manufactured by, for example, machining an aluminum-alloy slab to integrally form the hub part and the blade parts.

In addition, separate from the impeller main body, the brazing sheet is prepared comprising: the core material, which is composed of an aluminum alloy that contains Mg: 0.20 mass % or more and less than 1.80 mass %, and a filler-material layer, which is composed of an Al—Si-series alloy, has a thickness of 20-215 and is disposed on the outermost surface.

The core material of the brazing sheet is a material that does not melt during heating when brazing is being performed and has the shape of the shroud after brazing. The core material is composed of an aluminum alloy that contains Mg: 0.20 mass % or more and less than 1.80 mass %. More specifically, the aluminum alloy that constitutes the core material may have a chemical composition that contains Mg: 0.20 mass % or more and less than 1.80 mass %, the remainder being composed of Al (aluminum) and unavoidable impurities. In addition, the aluminum alloy that constitutes the core material may contain, other than Mg as an essential component, one or two or more optional components. Examples of optional components in the core material are, for example, Si, Cu (copper), Mn (manganese), Zn (zinc), Ti (titanium), and the like.

Mg in the core material diffuses from the core material during heating when brazing is being performed and elutes into the molten filler, thereby moving to the surface of the shroud. Furthermore, the Mg that reaches the surface of the shroud breaks down oxide films present on the surface of the shroud and on the surfaces of the blade parts. By setting the amount of Mg in the core material to 0.20 mass % or more, the amount of Mg that reaches the surface of the shroud can be made sufficiently large, and thereby the brazed joints between the shroud and the blade parts can be formed. Furthermore, in the brazed joints formed after brazing, the amount of Mg in the filler material can be made sufficiently large, and thereby joint strength can be increased.

In the situation in which the amount of Mg in the core material is less than 0.20 mass %, because the amount of the Mg that reaches the surface of the shroud becomes insufficient, there is a risk that it will become difficult to form robust brazed joints between the shroud and the blade parts. In the situation in which the amount of Mg in the core material is 1.80 mass % or more, there is a risk that the melting point of the core material will decrease excessively. Consequently, during heating when brazing is being performed, there is a tendency for deformation of the shroud, a phenomenon called erosion in which the molten filler penetrates into the core material, and the like to occur.

The filler-material layer, which is composed of an Al—Si-series alloy, is provided on the core material of the brazing sheet before brazing. For example, an aluminum alloy that contains Si: 6 mass % or more and 13 mass % or less can be used as the Al—Si-series alloy that constitutes the filler-material layer. More specifically, the Al—Si-series alloy may have a chemical composition that contains Si: 6 mass % or more and 13 mass % or less, the remainder being composed of Al and unavoidable impurities. In addition, the Al—Si-series alloy may contain, in addition to Si as an essential component, one or two or more optional components.

For example, the Al—Si-series alloy that constitutes the filler-material layer may contain Bi (bismuth): 0.0050 mass % or more and less than 0.060 mass % as an optional component. Bi in the filler-material layer can further improve the wettability of the molten filler and can more effectively curtail the occurrence of brazing defects. However, in the situation in which the amount of Bi in the filler-material layer is excessively large, there is a risk that, in the process of manufacturing the brazing sheet, the oxide film formed on the surface of the filler-material layer will become thick, which will lead to a degradation in brazeability. By setting the Bi content in the filler-material layer to the above-mentioned specified range, the occurrence of brazing defects can be more effectively curtailed while avoiding the problems described above.

In addition, the amount of Bi in the filler-material layer is more preferably 0.010 mass % or more and less than 0.060 mass %. In this situation, robust brazed joints between the blade parts and the shroud are reliably formed, and thereby joint strength can be further increased.

In addition, in the Al—Si-series alloy that constitutes the filler-material layer, Be (beryllium), Li (lithium), or the like may be added as an optional component.

The thickness of the filler-material layer of the brazing sheet before brazing can be set, as appropriate, from within the range of 20-215 In the situation in which the thickness of the filler-material layer is less than 20 there is a risk that the amount of molten filler produced during brazing will be insufficient, which will lead to the occurrence of a brazing defect. In the situation in which the thickness of the filler-material layer is more than 215 because the distance from the core material to the surface of the filler-material layer becomes excessively long, there is a risk that, during heating when brazing is being performed, the amount of the Mg that reaches the surface of the shroud will be insufficient. Consequently, in this situation as well, there is a risk that it will lead to the occurrence of a brazing defect.

The brazing sheet before brazing may have a two-layer structure that comprises the core material and the filler-material layer, which is layered on the core material. In this situation, the brazing sheet comprises: the core material, which is composed of an aluminum alloy that contains Mg: 0.30 mass % or more and less than 1.80 mass %; and the filler-material layer, which is composed of an Al—Si-series alloy, has a thickness of 20-215 μm, and is layered on the core material; and the thickness X [μm] of the filler-material layer and the Mg amount Y [mass %] in the core material preferably satisfy either Equation (1) below or Equation (2) below.

$$Y \geq X/120 \text{(provided that } X \geq 36\text{)} \quad (1)$$

$$Y \geq 0.30 \text{(provided that } X < 36\text{)} \quad (2)$$

With regard to the brazing sheet having the two-layer structure described above, in the situation in which the thickness of the filler-material layer is 36 μm or more, the greater the thickness of the filler-material layer becomes, the more the amount of the Mg that reaches the surface of the shroud tends to become small. Consequently, owing to not only simply setting the amount of Mg in the core material to within the specified range but also to the fact that the greater the thickness of the filler-material layer, the greater the amount of Mg in the core material, as in the above-mentioned Equation (1), the amount of the Mg that reaches the surface of the shroud during brazing is made sufficiently large, and thereby brazeability can be further improved. On the other hand, in the situation in which the thickness of the filler-material layer is less than 36 μm, the amount of Mg in the core material should be set to 0.30 mass % or more, as in the above-mentioned Equation (2).

In addition, the brazing sheet before brazing may have a three-layer structure that comprises the core material, the intermediate material, which is layered on the core material, and the filler-material layer, which is layered on the intermediate material. The configuration of the core material and the filler-material layer of the brazing sheet having a three-layer structure is the same as that of the brazing sheet having a two-layer structure. In the situation in which the brazing sheet has the intermediate material, the amount of Mg in the core material is preferably 0.40 mass % or more and less than 1.60 mass %.

The intermediate material is preferably composed of an aluminum alloy that contains Mg: 0.80 mass % or more and less than 6.50 mass %. That is, the aluminum alloy that constitutes the intermediate material may have a chemical composition that contains Mg: 0.80 mass % or more and less than 6.50 mass %, the remainder being composed of Al and unavoidable impurities. In addition, the aluminum alloy that constitutes the intermediate material may contain, other than Mg as an essential component, one or two or more optional components.

The same as the Mg in the core material, Mg in the intermediate material also diffuses into the filler-material layer during heating when brazing is being performed and thereby moves toward the surface of the shroud. Furthermore, the oxide film is broken down by the Mg that reaches the surface of the shroud, and therefore brazing can be performed.

By setting the amount of Mg in the intermediate material to the above-mentioned specified range, the amount of Mg that reaches the surface of the shroud can be made sufficiently large, and thereby brazeability can be further improved. Furthermore, in the brazed joints formed after the brazing, the amount of Mg in the filler material can be made sufficiently large, and thereby joint strength can be further increased.

In the situation in which the amount of Mg in the intermediate material is less than 0.80 mass %, there is a risk that the amount of Mg in the filler material of the brazed joints will be insufficient, thereby reducing the effect of improving joint strength. In addition, in the situation in which the amount of Mg in the intermediate material is 6.50 mass % or more, there is a risk that, in the process of manufacturing the brazing sheet, rollability of the intermediate material will become low, and therefore it will become difficult to manufacture the brazing sheet.

Other than Mg as an essential component, the intermediate material may contain Si: 2.0 mass % or more and 13.0 mass % or less as an optional component. In this situation, the melting-start temperature of the intermediate material can be further lowered, thereby further promoting the diffusion of Mg from the intermediate material into the filler-material layer during heating when brazing is being performed and further promoting elution of Mg into the molten filler. As a result, the amount of Mg that reaches the surface of the shroud can be made sufficiently large, and thereby brazeability can be further improved.

In the situation in which the Si content in the intermediate material is less than 2.0 mass %, there is a risk that it will become difficult to sufficiently obtain the functions and effects produced by Si. In the situation in which the Si content in the intermediate material is more than 13.0 mass %, there is a risk that, in the process of manufacturing the brazing sheet, rollability of the intermediate material will become low, and therefore it will become difficult to manufacture the brazing sheet.

After the brazing sheet configured as described above has been prepared, the above-mentioned shroud is manufactured by performing forming work on the above-mentioned brazing sheet. The method of the forming work is not particularly limited; for example, press working or the like can be used.

In the above-mentioned manufacturing method, it is preferable to etch the surface of the brazing sheet using an acid or an alkali during the interval from after the brazing sheet has been prepared until brazing is performed. In this situation, the thick oxide film formed in the process of manufacturing the brazing sheet can be made brittle by the etching, and thereby brazeability can be further improved.

Subsequently, the above-mentioned shroud and the above-mentioned impeller main body are brazed to one another, without the use of flux, in an inert gas. In the initial stage of the brazing, Mg in the core material diffuses into the solid filler-material layer and thereby moves toward the surface of the shroud. In addition, when the brazing progresses and the filler material begins to melt, the speed at which Mg moves from the core material into the molten filler increases remarkably, and thereby a large amount of Mg reaches the surface of the shroud. Furthermore, by virtue of the oxide film being broken down by the Mg that reaches the surface of the shroud, brazed joints are formed between the shroud and the blade parts.

In addition, in brazing in which the brazing sheet is used, the molten filler is formed over the entire surface of the brazing sheet. The molten filler collects, owing to surface tension, in the gaps between the blade parts and the shroud, and thereby the brazed joints are formed. In the situation in which a portion of the molten filler has not moved into the spaces between the blade parts and the shroud, that molten filler will remain on the surface of the core material and remain as a filler material in the shape of a layer whose thickness is less than what it was before brazing. Owing to the above, the shroud and the impeller main body can be brazed, and thereby a closed impeller can be obtained.

For example, nitrogen, argon, helium, or the like can be used as the inert gas that is used in brazing. The pressure of the inert gas during brazing can be set to within a range of, for example, 1-110,000 Pa. That is, the brazing may be performed at atmospheric pressure or under a pressure that is slightly higher than atmospheric pressure and may be performed in a vacuum of 1 Pa or higher.

In the situation in which the pressure of the inert gas during brazing is excessively low, the Mg tends to evaporate from the molten filler during heating when brazing is being performed. Consequently, there is a risk that the amount of Mg in the filler material in the brazed joints will be insufficient, which will lead to a decrease in the strength of the brazed joints. By setting the pressure of the inert gas during brazing to 1 Pa or higher, such a problem can be avoided.

In the above-mentioned manufacturing method, after brazing has been performed, it is preferable to perform a solution treatment on the above-mentioned closed impeller and subsequently to perform an artificial-aging treatment on the above-mentioned closed impeller. In the solution treatment, by rapidly cooling the closed impeller after it has been heated to the solution-treatment temperature of the filler material, the filler material can be made into a supersaturated solid solution of Mg.

Next, by performing the artificial-aging treatment, Mg-containing intermetallic compounds are finely precipitated within the filler material in the brazed joints. The intermetallic compound precipitates at the grain boundaries of the filler material and thereby acts to further increase the strength of the filler material. For this reason, by performing the solution treatment and the artificial-aging treatment, the joint strength of the brazed joints can be further increased.

The treatment temperature during the solution treatment can be set as appropriate within the range of, for example, 480° C.-560° C. In addition, rapid-cooling methods in the solution treatment are not particularly limited, and, for example, water quenching or the like can be used.

In addition, the hold temperature during the artificial-aging treatment can be set as appropriate within the range of, for example, 160° C.-220° C. In addition, the hold time during the artificial-aging treatment can be set as appropriate within the range of, for example, 4-24 h.

WORKING EXAMPLES

Working Example 1

Figure 1:
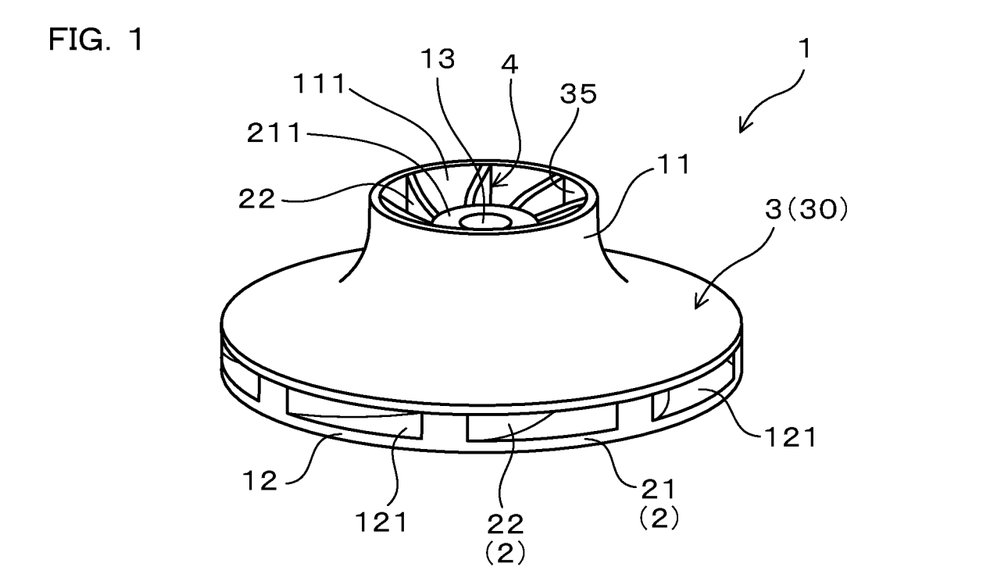
FIG. 1 is an oblique view of a closed impeller according to Working Example 1.
Figure 2:
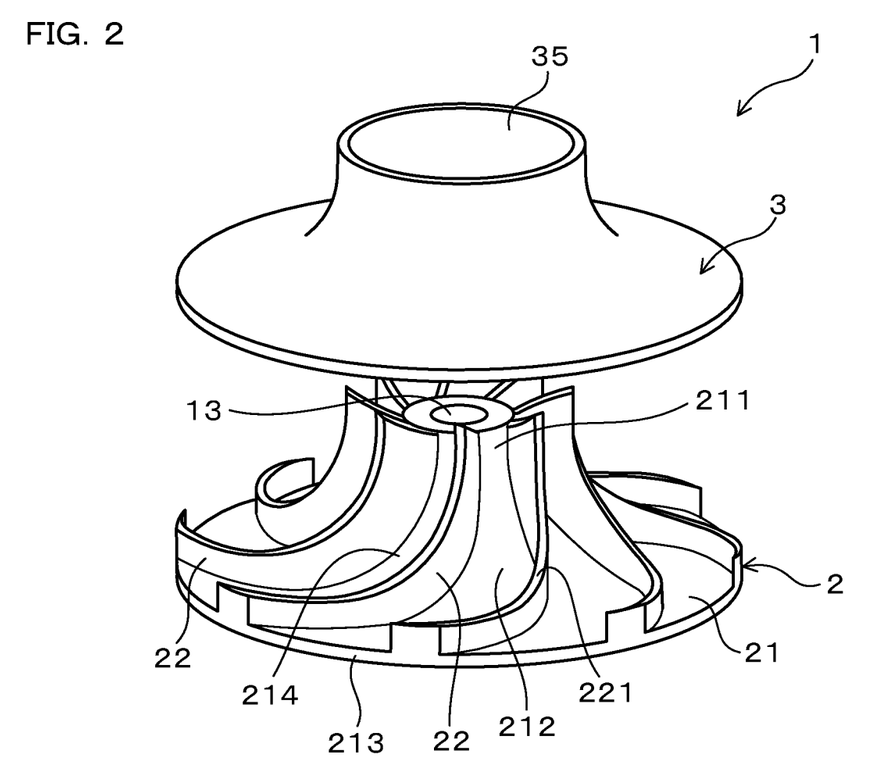
FIG. 2 is an exploded, oblique view of the closed impeller according to Working Example 1.
Figure 3:
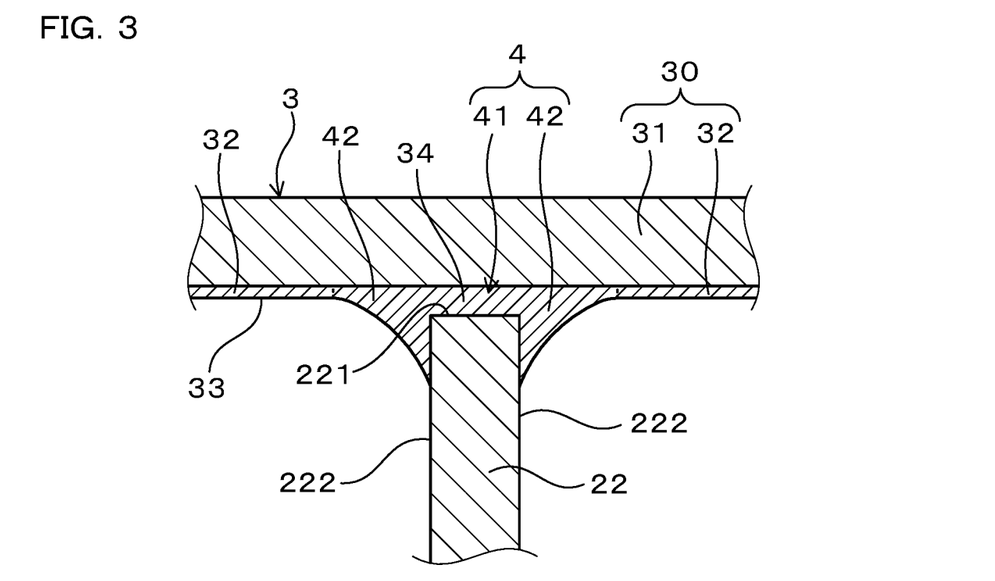
FIG. 3 is a partial cross-sectional view of a brazed joint, which is interposed between a shroud and a blade part, according to Working Example 1.

A working example of the above-mentioned closed impeller and the method of manufacturing the same will now be explained, with reference to FIG. 1 to FIG. 4. As shown in FIG. 1 and FIG. 2, a closed impeller 1 comprises: an impeller main body 2, which is composed of an aluminum alloy and comprises a hub part 21 and blade parts 22 that protrude from the hub part 21; and a shroud 3, which covers the blade parts 22. As shown in FIG. 3, the blade parts 22 and the shroud 3 are joined by brazed joints 4, which are interposed between the blade parts 22 and the shroud 3. In addition, the shroud 3 is a brazing sheet 30 that comprises: a core material 31, which is composed of an aluminum alloy; and a filler material 32, which is disposed on the core material 31 and is present on an outermost surface 33 opposing the blade parts 22. It is noted that, hereinbelow, the outermost surface 33 of the shroud 3 that opposes the blade parts 22 is called "the inner surface 33 of the shroud 3."

As shown in FIG. 1, the closed impeller 1 of the present example comprises: a small-diameter part 11, which exhibits a substantially truncated-cone shape and whose outermost diameter is small; and a large-diameter part 12, whose outermost diameter is large. In addition, the closed impeller 1 has a through hole 13 that passes through the center of rotation of the closed impeller 1. The rotary shaft of the centrifugal compressor is inserted into the through hole 13 of the closed impeller 1. The rotary shaft of the centrifugal compressor is connected to a drive apparatus, such as a motor, and the driving force of the drive apparatus is transmitted to the closed impeller 1 via the rotary shaft. Thereby, the closed impeller 1 can be caused to rotate.

The small-diameter part 11 has suction ports 111, which are open in the axial direction of the closed impeller 1. In addition, the large-diameter part 12 has discharge ports 121, which open outward in the radial direction of the closed impeller 1. Furthermore, the interior of the closed impeller 1 has passageways that connect the suction ports 111 and the discharge ports 121. Specifically, the suction ports 111 of the closed impeller 1 are openings that are enclosed by: a front-end portion 211 of the hub part 21, which is described below; the blade parts 22; and the shroud 3. In addition, the discharge ports 121 of the closed impeller 1 are openings that are enclosed by: a rear-end portion 213 of the hub part 21, which is described below; the blade parts 22; and the shroud 3. Furthermore, although not shown in the drawings, the passageways of the closed impeller 1 are spaces that are enclosed by: curved surfaces 214 (refer to FIG. 2) of the hub part 21, which are described below; the blade parts 22; and the shroud 3.

The closed impeller 1 of the present example, by being caused to rotate inside the centrifugal compressor, can suction fluid via the suction ports 111. The fluid suctioned via the suction ports 111 is guided, inside the passageways, to the discharge ports 121 while being accelerated as the closed impeller 1 rotates. Furthermore, the fluid discharged via the discharge ports 121 is compressed inside a diffuser of the centrifugal compressor.

More specifically, as shown in FIG. 2, the closed impeller 1 of the present example comprises: the impeller main body 2, which comprises the hub part 21 and the blade parts 22; and the shroud 3, which covers the impeller main body 2. The hub part 21 of the impeller main body 2 exhibits a substantially truncated-cone shape, the same as that of the closed impeller 1. The hub part 21 comprises: the front-end portion 211, which is an end portion on the suction port 111 side; the rear-end portion 213, which is an end portion on the discharge ports 121 side; an enlarging-diameter portion 212, which connects the front-end portion 211 and the rear-end portion 213; and the through hole 13, which passes through the front-end portion 211, the enlarging-diameter portion 212, and the rear-end portion 213. The through hole 13 is open at the center of the front-end portion 211 and at the center of the rear-end portion 213.

The enlarging-diameter portion 212 gradually enlarges as it goes from the front-end portion 211 toward the rear-end portion 213. In addition, the enlarging-diameter portion 212 has the curved surfaces 214, which oppose the shroud 3. Although not shown in the drawings, the curved surfaces 214 of the enlarging-diameter portion 212 have a curved shape such that the contour of a cross section that includes the center of rotation of the closed impeller 1 is curved such that it forms a protrusion on the inner side.

As shown in FIG. 2, the impeller main body 2 of the present example has a plurality of the blade parts 22. The blade parts 22 are provided such that they are erect from the curved surface 214 of the enlarging-diameter portion 212 toward the shroud 3 side. The blade parts 22 exhibit a helical shape in plan view when viewed from the suction port 111 side and are provided such that they extend across the span from the front-end portion 211 of the hub part 21 to the rear-end portion 213. In addition, each of the blade parts 22 of the present example has a thickness of 2 mm. The thickness of the blade parts 22 is not limited in an aspect of the present example and can be set as appropriate from within the range of, for example, 0.2-5.0 mm. In addition, the thickness of the blade parts 22 does not have to be constant.

As shown in FIG. 3, an end surface 221 of the blade part 22 on the shroud 3 side is joined to the shroud 3 via the brazed joint 4. The end surface 221 of the blade part 22 of the present example is curved along the inner surface 33 of the shroud 3 and is disposed opposing the core material 31 of the shroud 3. Filler material 34 is filled between the end surface 221 of the blade part 22 and the core material 31. Thereby, a surface-junction part 41, at which the end surface 221 and the core material 31 are joined in a planar manner to one another, can be formed in the brazed joint 4.

The shroud 3 of the present example exhibits a funnel shape, as shown in FIG. 2, and is disposed such that it covers the end surfaces 221 of the blade parts 22. A center opening 35 is provided at the center of the shroud 3, and, as shown in FIG. 1, the front-end portion 211 of the hub part 21 is disposed inside the center opening 35. In addition, the brazed joint 4, which is shown in FIG. 3, is formed across the entire length between the inner surface 33 of the shroud 3 and the end surface 221 of each of the blade parts 22.

As shown in FIG. 3, the shroud 3 of the present example is constituted from the brazing sheet 30 after brazing. That is, the shroud 3 comprises the core material 31, which forms the shape of the shroud 3, and the laminar filler material 32, which is disposed on the core material 31. The filler material 32 is formed by the molten filler, from among the filler material 32 of the brazing sheet 30 before brazing, that has remained on the core material 31 after heating when brazing is being performed.

The brazed joints 4 are interposed between the shroud 3 and the blade parts 22. As shown in FIG. 3, each of the brazed joints 4 of the present example comprises: the surface-junction part 41, which includes the filler material 34 filled in the gap between the end surface 221 of the blade part 22 and the core material 31 of the shroud 3; and fillets 42, which are composed of the filler material 34 extending outward of the surface junction part 41. Each of the fillets 42 is connected to the laminar filler material 32 that is present on the inner surface 33 of the shroud 3, and the thickness of each of the fillets 42 gradually increases as it approaches the blade part 22. Furthermore, the thickness of each of the fillets 42 is greatest at the portion at which it abuts a side surface 222 of the blade part 22. It is noted that each of the fillets 42 according to the present specification refers to the portion of the filler material 34 that is thicker than the filler material 32 present on the inner surface 33 of the shroud 3.

The closed impeller 1 of the present example can be manufactured by, for example, the following method. First, the impeller main body 2 and the shroud 3 are separately prepared. The impeller main body 2 can be obtained by, for example, machining an aluminum-alloy slab to integrally form the hub part 21 and the blade parts 22.

The shroud 3 is constituted from a brazing sheet 300 (refer to FIG. 4), comprising: the core material 31, which is composed of an aluminum alloy that contains Mg: 0.20 mass % or more and less than 1.80 mass %; and a filler-material layer 320, which is composed of an Al—Si-series alloy, has a thickness of 20-215 and is disposed on the outermost surface. The shroud 3 can be manufactured by performing forming work on the brazing sheet that comprises the core material 31 and the filler-material layer 320. When manufacturing the shroud 3 from the brazing sheet, the forming work should be performed such that the filler-material layer 320 of the brazing sheet is disposed on the inner side of the closed impeller 1, that is, on the side opposing the blade parts 22.

Figure 4:
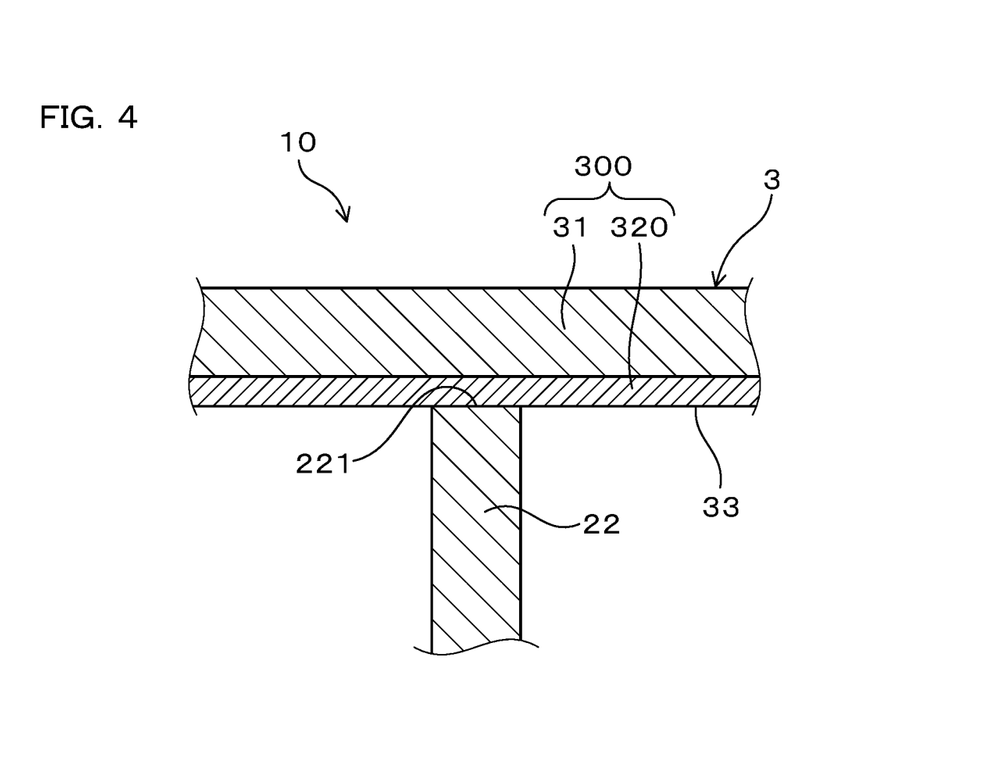
FIG. 4 is a partial cross-sectional view of a contact portion, which is between the shroud and the blade part before brazing, according to Working Example 1.

An assembly 10 is manufactured by overlaying the shroud 3, which has been prepared in this manner, on the blade parts 22 of the impeller main body 2. As shown in FIG. 4, in the assembly 10, the end surfaces 221 of the blade parts 22 of the impeller main body 2 make contact with the filler-material layer 320, which is disposed on the inner surface 33 of the shroud 3.

Subsequently, the shroud 3 and the impeller main body 2 are brazed to one another, without using flux, by the heating of the assembly 10 in inert gas. Owing to the above, a brazed joint 4, which is shown in FIG. 3, is formed between the shroud 3 and each of the blade parts 22, and thereby the closed impeller 1 can be obtained.

The shroud 3 of the closed impeller 1 of the present example is the brazing sheet 30 after brazing, comprising: the core material 31, which is composed of an aluminum alloy; and the filler material 32, which is present on the inner surface 33 of the shroud 3. Furthermore, the blade parts 22 of the impeller main body 2 and the shroud 3 are joined to one another via the brazed joints 4. Thus, by using the shroud 3, which consists of the brazing sheet 30, brazing can be performed without using a binder, flux, and the like, which are used in conventional dip brazing. For this reason, the formation of voids inside the brazed joints 4 can be curtailed. Furthermore, the brazed joints 4 formed after brazing are strengthened by the Mg that has diffused from the core material 31. As a result, the joint strength of the brazed joints 4 can be made remarkably higher than that of the brazed joints 4 formed by dip brazing.

In addition, each of the brazed joints 4 of the present example comprises the surface-junction part 41, in which the blade part 22 and the core material 31 are joined in a planar manner to one another. Thus, by providing the surface-junction part 41 in each of the brazed joints 4, the joint strength of the brazed joints 4 can be further increased.

Furthermore, each of the brazed joints 4 comprises the fillets 42, which consist of the filler material 34 extending from an outer portion of the surface-junction part 41. Thereby, in each of the brazed joints 4, the joint-surface area between the filler material 34 and the blade part 22 is greater than the joint-surface area between the filler material 34 and the core material 31, and thereby the joint strength of the brazed joint 4 can be further increased.

Working Example 2

The present example is an example in which the joint strength of a brazed joint 4, which formed between a shroud 3 and a blade part 22, was evaluated using a test piece 100 that simulates the shape of the shroud 3 and the blade part 22. It is noted that, among the symbols used in examples subsequent to the present example, those symbols identical to symbols used in a previous example indicate structural elements the same as the previous example, unless explained otherwise.

Figure 5:
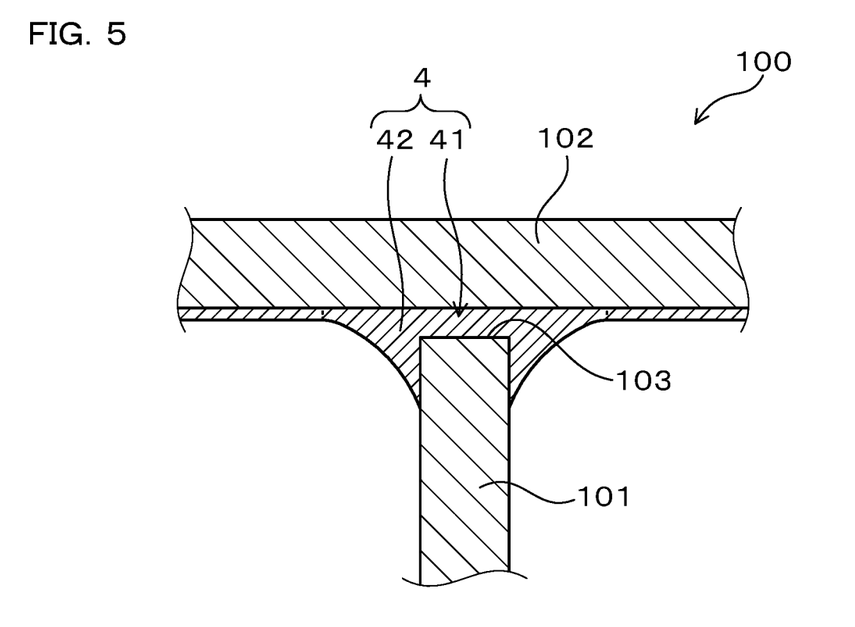
FIG. 5 is a partial cross-sectional view that shows the principal parts of a test piece, according to Working Example 2.

As shown in FIG. 5, the test piece 100 used in the present example comprises: a first part 101, which simulates the blade part 22; and a second part 102, which simulates the shroud 3. The first part 101 is a plate composed of a JIS A6061 alloy and having a thickness of 3 mm. In addition, the second part 102 is a brazing sheet 300 (Test Materials 1-21), which has the layered structure shown in Table 1 and has a thickness of 2 mm.

It is noted that the symbol "Bal." in Table 1 is a symbol that indicates the remaining portion, and the symbol "-" is a symbol that indicates that the relevant element has not been actively added. The content of an element indicated by the symbol "-" is, specifically, 0.05 mass % or less (including 0 mass %). In addition, the cladding percentages of the filler-material layer and the intermediate material, that is, the percentages (%) of the thicknesses of the filler-material layer and the intermediate material relative to the thickness of the brazing sheet 300 before brazing, were recorded in the "Cladding Percentage" column, and the thicknesses (μm) of the filler-material layer and the intermediate material were recorded in the "Thickness" column.

With regard to Test Materials 17, 19 from among the test materials listed in Table 1, subsequent evaluation was not performed because problems, such as cracks during rolling, cladding-joint defects, etc., occurred in the process of manufacturing the brazing sheet 300.

After the first part 101 and the second part 102 were prepared, an end surface 103 of the first part 101 was butted against the filler-material layer of the second part 102 to obtain a T-shaped assembly. Upon brazing the assembly by heating it in an inert gas at atmospheric pressure or in a vacuum, the brazed joint 4, which included the surface junction part 41 and the fillets 42, was formed between the first part 101 and the second part 102, and thereby the test piece 100 could be obtained.

The brazing in inert gas at atmospheric pressure could be performed using an inert-gas-atmosphere furnace. Specifically, after the assembly was disposed in the furnace, the interior of the furnace was purged using nitrogen gas, and the oxygen concentration inside the furnace was lowered to 15 vol. ppm. Subsequently, by heating the assembly until the in-furnace temperature reached 600° C., the first part 101 and the second part 102 were brazed, and that was used as the test piece 100. After the temperature inside the furnace reached 600° C., heating was stopped and the test piece 100 cooled inside the furnace until the molten filler solidified. Subsequently, the test piece 100 was removed from the furnace and cooled to room temperature.

The brazing in a vacuum could be performed using a vacuum furnace. Specifically, after the assembly was disposed inside a vacuum furnace, the assembly was heated until it became 550° C. while the atmosphere was exhausted from the interior of the furnace. The pressure inside the furnace at the point in time when the temperature of the assembly reached 550° C. was, for example, $5 \times 10^{-3}$-$7 \times 10^{-3}$ Pa. After the temperature of the assembly reached 550° C., argon gas was introduced into the interior of the furnace while continuing the exhausting. Then, the assembly was heated at 600° C. while the amount of supply of argon gas was adjusted such that the in-furnace pressure became 1 Pa or more. Thereby, the first part 101 and the second part 102 were brazed, and that was used as the test piece 100. After the temperature inside the furnace reached 600° C., heating was stopped, and the test piece 100 cooled inside the furnace until the molten filler solidified. Subsequently, the test piece 100 was removed from the furnace and cooled to room temperature.

In the present example, the solution treatment and the artificial-aging treatment were further performed on the test piece 100, which had been brazed using any of the above-mentioned methods. In the solution treatment, specifically, after the test piece 100 was immersed in a 550° C. salt-bath furnace for 3 min and heated, water quenching was performed. In the artificial-aging treatment, the test piece 100, which had undergone the solution treatment, was held for 8 h at a temperature of 175° C. using an air furnace.

The joint strength of the brazed joints 4 of the test pieces 100 that had undergone the above processes could be measured as follows. First, the second part 102 was mounted, via a jig, on a fixed chuck of a tensile testing machine. At this time, deformation of the second part 102 during the tensile test was curbed by restraining the second part 102, using a jig, from both surfaces in the thickness direction. Next, the first part 101 was mounted on a crosshead of the tensile testing machine. Then, tensile testing was performed, in which the movement speed of the crosshead was set to 10 mm/min, and thereby a load-displacement curve was obtained.

The tensile strengths of the brazed joints 4 were calculated by dividing the maximum load on the obtained load-displacement curve by the maximum cross-sectional area of the brazed joint 4, that is, by the total of the surface area of the fillets 42 and the surface area of the end surface 103 of the first part 101. In the present example, the value of the tensile strength is taken as the joint strength of the brazed joint 4. The joint strengths of the brazed joints 4 of the test pieces 100 that were brazed in inert gas at atmospheric pressure were recorded in the "Atmospheric Pressure" column in Table 2. In addition, the joint strengths of the brazed joints 4 of the test pieces 100 that were brazed in a vacuum were recorded in the "In Vacuum" column in Table 2.

TABLE 1

| Test Material Symbol | Layered Structure | Chemical Composition (mass %) | | | | | | | Cladding Percentage (%) | Thickness (μm) |
|---|---|---|---|---|---|---|---|---|---|---|
| | | Si | Fe | Cu | Mn | Mg | Bi | Al | | |
| 1 | Filler-material layer | 10 | 0.18 | — | — | — | 0.020 | Bal. | 1.4 | 28 |
| | Core material | 0.35 | 0.20 | 0.27 | — | 0.30 | — | Bal. | — | — |
| 2 | Filler-material layer | 10 | 0.18 | — | — | — | 0.020 | Bal. | 3 | 60 |
| | Core material | 0.35 | 0.20 | 0.27 | — | 0.55 | — | Bal. | — | — |
| 3 | Filler-material layer | 10 | 0.18 | — | — | — | 0.020 | Bal. | 10 | 200 |
| | Core material | 0.35 | 0.20 | 0.27 | — | 1.78 | — | Bal. | — | — |
| 4 | Filler-material layer | 10 | 0.18 | — | — | — | 0.020 | Bal. | 4.5 | 90 |
| | Core material | 0.60 | 0.20 | 0.3 | 0.07 | 1.0 | — | Bal. | — | — |

TABLE 1-continued

| Test Material Symbol | Layered Structure | Si | Fe | Cu | Mn | Mg | Bi | Al | Cladding Percentage (%) | Thickness (μm) |
|---|---|---|---|---|---|---|---|---|---|---|
| 5 | Filler-material layer | 10 | 0.18 | — | — | — | — | Bal. | 3 | 60 |
|   | Core material | 0.35 | 0.20 | 0.27 | — | 0.55 | — | Bal. | — | — |
| 6 | Filler-material layer | 10 | 0.18 | — | — | — | 0.020 | Bal. | 3.5 | 70 |
|   | Intermediate material | — | 0.18 | — | — | 3.0 | — | Bal. | 1 | 20 |
|   | Core material | 0.35 | 0.20 | 0.27 | — | 0.43 | — | Bal. | — | — |
| 7 | Filler-material layer | 10 | 0.18 | — | — | — | 0.020 | Bal. | 3.5 | 70 |
|   | Intermediate material | 7.5 | 0.18 | — | — | 3.0 | — | Bal. | 1 | 20 |
|   | Core material | 0.35 | 0.20 | 0.27 | — | 0.43 | — | Bal. | — | — |
| 8 | Filler-material layer | 10 | 0.18 | — | — | — | 0.020 | Bal. | 3.5 | 70 |
|   | Intermediate material | 7.5 | 0.18 | — | — | 0.82 | — | Bal. | 2 | 40 |
|   | Core material | 0.35 | 0.20 | 0.27 | — | 0.60 | — | Bal. | — | — |
| 9 | Filler-material layer | 10 | 0.18 | — | — | — | 0.020 | Bal. | 3.5 | 70 |
|   | Intermediate material | 7.5 | 0.18 | — | — | 6.5 | — | Bal. | 1 | 20 |
|   | Core material | 0.35 | 0.20 | 0.27 | — | 0.43 | — | Bal. | 3.5 | 70 |
| 10 | Filler-material layer | 10 | 0.18 | — | — | — | 0.020 | Bal. | 3.5 | 70 |
|    | Intermediate material | 2.0 | 0.18 | — | — | 3.0 | — | Bal. | 1 | 20 |
|    | Core material | 0.35 | 0.20 | 0.27 | — | 0.60 | — | Bal. | — | — |
| 11 | Filler-material layer | 10 | 0.18 | — | — | — | 0.020 | Bal. | 3.5 | 70 |
|    | Intermediate material | 13 | 0.18 | — | — | 3.0 | — | Bal. | 1 | 20 |
|    | Core material | 0.35 | 0.20 | 0.27 | — | 0.43 | — | Bal. | — | — |
| 12 | Filler-material layer | 10 | 0.18 | — | — | — | 0.010 | Bal. | 3 | 60 |
|    | Core material | 0.35 | 0.20 | 0.27 | — | 0.55 | — | Bal. | — | — |
| 13 | Filler-material layer | 10 | 0.18 | — | — | — | 0.058 | Bal. | 3 | 60 |
|    | Core material | 0.35 | 0.20 | 0.27 | — | 0.55 | — | Bal. | — | — |
| 14 | Filler-material layer | 10 | 0.18 | — | — | — | 0.020 | Bal. | 1.4 | 28 |
|    | Core material | 0.35 | 0.20 | 0.27 | — | 0.25 | — | Bal. | — | — |
| 15 | Filler-material layer | 10 | 0.18 | — | — | — | — | Bal. | 10 | 200 |
|    | Core material | 0.35 | 0.20 | 0.27 | — | 1.81 | — | Bal. | — | — |
| 16 | Filler-material layer | 10 | 0.18 | — | — | — | 0.020 | Bal. | 3 | 60 |
|    | Intermediate material | — | 0.18 | — | — | 0.75 | — | Bal. | 1 | 20 |
|    | Core material | 0.35 | 0.20 | 0.27 | — | 0.55 | — | Bal. | — | — |
| 17 | Filler-material layer | 10 | 0.18 | — | — | — | 0.020 | Bal. | 3 | 60 |
|    | Intermediate material | 7.5 | 0.18 | — | — | 6.8 | — | Bal. | 1 | 20 |
|    | Core material | 0.35 | 0.20 | 0.27 | — | 0.43 | — | Bal. | — | — |
| 18 | Filler-material layer | 10 | 0.18 | — | — | — | 0.020 | Bal. | 3.5 | 70 |
|    | Intermediate material | 1.5 | 0.18 | — | — | 3.0 | — | Bal. | 1 | 20 |
|    | Core material | 0.35 | 0.20 | 0.27 | — | 0.43 | — | Bal. | — | — |
| 19 | Filler-material layer | 10 | 0.18 | — | — | — | 0.020 | Bal. | 3.5 | 70 |
|    | Intermediate material | 13.8 | 0.18 | — | — | 3.0 | — | Bal. | 1 | 20 |
|    | Core material | 0.35 | 0.20 | 0.27 | — | 0.60 | — | Bal. | — | — |
| 20 | Filler-material layer | 10 | 0.18 | — | — | — | 0.007 | Bal. | 3 | 60 |
|    | Core material | 0.35 | 0.20 | 0.27 | — | 0.55 | — | Bal. | — | — |
| 21 | Filler-material layer | 10 | 0.18 | — | — | — | 0.080 | Bal. | 3 | 60 |
|    | Core material | 0.35 | 0.20 | 0.27 | — | 0.55 | — | Bal. | — | — |

TABLE 2

| Test Material Symbol | Joint Strength (MPa) At Atmospheric Pressure | Joint Strength (MPa) In Vacuum | Remarks |
|---|---|---|---|
| 1 | 166 | 163 | |
| 2 | 188 | 187 | |
| 3 | 215 | 214 | |
| 4 | 190 | 189 | |
| 5 | 159 | 160 | |
| 6 | 245 | 242 | |
| 7 | 248 | 245 | |
| 8 | 195 | 193 | |
| 9 | 262 | 261 | |
| 10 | 252 | 250 | |
| 11 | 250 | 251 | |
| 12 | 180 | 179 | |
| 13 | 181 | 178 | |
| 14 | 132 | 134 | |
| 15 | 124 | 117 | Erosion occurred |
| 16 | 187 | 188 | |
| 17 | — | — | Test material could not be manufactured |
| 18 | 244 | 243 | |
| 19 | — | — | Test material could not be manufactured |
| 20 | 159 | 159 | |
| 21 | 146 | 148 | |

As shown in Table 1 and Table 2, each of Test Materials 1-16, 18, 20-21 comprises a core material that includes Mg in the above-mentioned specified range. Consequently, according to these test materials, brazed joints 4 having a joint strength of 110 MPa or higher could be formed for every brazing under atmospheric pressure and every brazing in a vacuum. Because the joint strength of a brazed joint produced by conventional dip brazing is normally approximately 100 MPa, according to these test materials, the joint strength of the brazed joint 4 could be made higher than in dip brazing.

Among these test materials as well, particularly with regard to Test Materials 1-13, 18, 20, in which the amount of Mg in the core material and the amount of Mg in the intermediate material were within the preferable content ranges described above, brazed joints 4 having a joint strength of 150 MPa or higher could be formed, and the joint strength of the brazed joints 4 could be made remarkably higher than in dip brazing.

With regard to Test Material 14, because the amount of Mg in the core material was below the preferable content range described above, the joint strength of the brazed joint 4 was prone to become lower than that of Test Materials 1-13, 18, 20.

With regard to Test Material 15, because the amount of Mg in the core material was below the preferable content range described above, erosion was prone to occur.

With regard to Test Material 16, because the amount of Mg in the intermediate material was below the preferable content range described above, the effect of increasing strength owing to the Mg in the intermediate material was prone to become insufficient.

With regard to Test Material 17 and Test Material 19, because the amount of Mg and the amount of Si in the intermediate material were above the above-mentioned specified ranges, it was difficult to join the core material and the filler-material layer in the process of manufacturing the brazing sheet 300.

With regard to Test Material 20, because the amount of Bi in the filler was below the preferable content range described above, the effect of increasing the strength owing to Bi was prone to become insufficient.

With regard to Test Material 21, because the amount of Bi in the filler was above the preferable content range described above, the joint strength of the brazed joint 4 was prone to become lower than that of Test Materials 1-13, 18.

Working Example 3

The present example is an example in which brazeability was evaluated when impeller main bodies 2 composed of a JIS A6061 alloy and shrouds 3 composed of the test materials listed in Table 1 were brazed. In the present example, a cutting process was first performed on a slab of a JIS A6061 alloy to manufacture impeller main bodies 2 having an outer diameter of 40 mm. Then, shrouds 3 corresponding to the impeller main bodies 2 were manufactured using the test materials listed in Table 1. The impeller main bodies 2 and the shrouds 3 were brazed using the method described in Working Example 2, and thereby closed impellers 1 were obtained.

Brazeability could be evaluated based on the shape of the fillets 42 formed on the brazed joint 4 and state of the occurrence of joint defects inside the brazed joint 4. When evaluating the shape of the fillets 42, first, the closed impeller 1 after brazing was cut. Then, the shapes of the fillets 42 of the brazed joint 4 that were visible from the cut portion were observed. The meaning of each symbol recorded in the "Fillet Shape" column in Table 3 is as below.

A+: A fillet was formed having a uniform shape, a smooth surface, and a leg length of 0.5 mm or more A: State in which a fillet was formed having a uniform shape, a smooth surface, and a leg length of less than 0.5 mm B: State in which a fillet was formed having a uniform shape but a slightly rough surface, or a fillet was formed having a slightly nonuniform shape but a smooth surface C: State in which a fillet was formed having a nonuniform shape, or a fillet was formed whose surface was conspicuously rough D: State in which a fillet was formed discontinuously or a fillet was not formed at all With regard to the evaluation of the shape of the fillets 42, the cases of symbols A+ to C, wherein continuous fillets were formed, were determined to be acceptable because they had brazeability at a permissible level, and the case of symbol D, in which continuous fillets were not formed, was determined to be unacceptable because brazeability was low.

When evaluating the state of the occurrence of joint defects, the same as in the evaluation of the shape of the fillets 42, the closed impeller 1 after brazing was cut. Then, a cross section of the brazed joint 4 was observed using a microscope. The meanings of symbols recorded in the "Joint Defects" column in Table 3 are as follows.

A+: A joint defect, such as a void, was not present inside the brazed joint 4

A: A void with a diameter of less than 0.1 mm was present inside the brazed joint 4

B: A void with a diameter of more than 0.1 mm and 0.2 mm or less was present inside the brazed joint 4

C: A void with a diameter of more than 0.2 mm was present inside the brazed joint 4

With regard to the evaluation of joint defects, the cases of symbols A+ to B, wherein the size of voids present inside the brazed joint 4 were 0.2 mm or less, were determined to be acceptable because they had brazeability at a permissible level, and the case of symbol C, wherein the size of voids was more than 0.2 mm, was determined to be unacceptable because brazeability was low.

TABLE 3

| Test Material Symbol | At Atmospheric Pressure | | In Vacuum | | Remarks |
|---|---|---|---|---|---|
| | Fillet Shape | Joint Defects | Fillet Shape | Joint Defects | |
| 1 | B | A+ | B | A+ | |
| 2 | A | A+ | B | A+ | |
| 3 | A | A+ | A | A | |
| 4 | A | A+ | A | A+ | |
| 5 | B | A+ | B | A+ | |
| 6 | A | A+ | A+ | A+ | |
| 7 | A+ | A+ | A | A | |
| 8 | A+ | A+ | A | A+ | |
| 9 | A+ | A+ | A | A | |
| 10 | A+ | A+ | A | A+ | |
| 11 | A+ | A+ | A | A+ | |
| 12 | A | A+ | B | A+ | |
| 13 | B | A+ | B | A+ | |
| 14 | C | A+ | C | A+ | |
| 15 | C | B | C | B | Erosion occurred |
| 16 | C | A+ | C | A+ | |
| 17 | — | — | — | — | Test material could not be manufactured |
| 18 | A | A+ | A | A+ | |
| 19 | — | — | — | — | Test material could not be manufactured |
| 20 | A | A+ | B | A+ | |
| 21 | C | B | B | B | |

As shown in Table 3, by performing brazing using a brazing sheet (Test Materials 1-16, 18, 20-21) comprising a core material that contained Mg in the above-mentioned specified range, it could be understood that the brazed joint 4 was formable between the shroud 3 and the blade part 22. It is noted that, in the situation in which brazing was performed using these brazing sheets, as shown in FIG. 3, laminar filler material 32 was formed over the entire inner surface of the shroud 3 after brazing.

Among these test materials as well, particularly with regard to Test Materials 1-13, 18, 20, wherein the amount of Mg in the core material and the amount of Mg in the intermediate material were in the preferable content ranges described above, the shapes of the fillets 42 were improved over that of Test Material 14, in which the amount of Mg in the core material was below the preferable content range described above, and the number of joint defects could be further reduced.

Furthermore, with regard to Test Materials 6-11, 18, 20, wherein the above-mentioned specified intermediate material was provided between the core material and the filler-material layer, the shapes of the fillets 42 could be further improved over test materials other than these.

With regard to Test Material 15, because the amount of Mg in the core material was above the above-mentioned specified range, erosion was prone to occur. For this reason, with regard to Test Material 15, the shapes of the fillets 42 were worse than those of Test Materials 1-13, 18, 20, and the number of joint defects were prone to increase.

With regard to Test Material 16, because the amount of Mg in the intermediate material was below the above-mentioned specified range, the effect of improving brazeability due to Mg was prone to become insufficient.

With regard to Test Material 17 and Test Material 19, because the amount of Mg and the amount of Si in the intermediate material were above the above-mentioned specified ranges, it was difficult to manufacture the brazing sheet 300, as described above.

With regard to Test Material 21, because the amount of Bi in the filler was above the above-mentioned specified range, brazeability was prone to be worse than that of Test Materials 1-13, 18, 20.

Comparative Examples

The present example is an example in which brazing of a shroud 3 and an impeller main body 2 was performed using flux. In the present example, the impeller main body 2 and the shroud 3 were brazed using the same method as brazing at atmospheric pressure in Working Example 3, except that a flux paste, which included a Cs-containing flux and a binder, was applied between the impeller main body 2 and the shroud 3. The results of evaluations of the shapes of the fillets 42 and joint defects in the closed impellers 1 of the present example are listed in Table 4.

TABLE 4

| Test Material Symbol | Flux Brazing | |
|---|---|---|
| | Fillet Shape | Joint Defects |
| 14 | C | C |
| 16 | C | C |

As shown in Table 4, in the situation in which brazing was performed using the flux paste, joint defects due to gas produced from the flux or the like during brazing were prone to occur. Consequently, in the situation in which flux paste was used, the joint strength of the brazed joint 4 was prone to be low.

Aspects of the closed impeller and the method of manufacturing the same according to the present invention are not limited to the aspects of the working examples described above, and modifications can be made as appropriate within a scope that does not depart from the gist of the present invention.

For example, the above-mentioned working examples are pertinent to a closed impeller in which the brazed joint 4, which comprises the filler material 34, containing Mg: 0.25 mass % or more, between the blade parts 22 and the shroud 3, is formed by performing brazing using the brazing sheet 30.

This disclosure, if considered from another viewpoint, also can be considered to be pertinent to a closed impeller comprising a brazed joint that comprises the filler material strengthened by Mg. That is, the above-mentioned working examples can be taken as one aspect of the present disclosure according to a closed impeller comprising:

an impeller main body, which is composed of an aluminum material and comprises a hub part and blade parts that protrude from the hub part;

a shroud, which is composed of an aluminum material and covers the blade parts; and brazed joints, which are interposed between the blade parts and the shroud and join the blade parts and the shroud;

wherein the brazed joints comprise the filler material, which is composed of an aluminum alloy that contains Mg: 0.25 mass % or more.

It is noted that the "aluminum material" described above is a concept that includes aluminum and aluminum alloys.

As described above, the Mg in the filler material 34 of the brazed joint 4 acts to strengthen the filler material 34. Accordingly, the functions and effects in which the joint strength of the brazed joint is increased can be achieved as long as a brazed joint 4 that comprises the filler material 34 containing Mg in the above-mentioned specified amount can be formed between a blade part 22 and a shroud 3.

In addition, for example, the above-mentioned working examples are pertinent to the method of manufacturing the closed impeller 1, wherein an impeller main body 2 is prepared, a brazing sheet 300 comprising a core material 31 and a filler-material layer 320 is prepared, a shroud 3 in which the filler-material layer 320 is disposed (arranged) on an inner surface 33 side is manufactured by performing forming work on the brazing sheet 300, and the inner surface 33 of the shroud 3 and blade parts 22 of the impeller main body 2 are brazed in an inert gas without using flux.

This disclosure, if considered from another viewpoint, also can be considered to be pertinent to an impeller main body and a shroud are joined by a flux-free-brazing method. That is, the above-mentioned working examples can be taken as one example of the present disclosure according to a method of manufacturing a closed impeller comprising: an impeller main body, which is composed of an aluminum material and comprises a hub part and blade parts that protrude from the hub part; a shroud, which is composed of the aluminum material and covers the blade parts; and brazed joints, which are interposed between the blade parts and the shroud and join the blade parts and the shroud, the method comprising:

preparing an assembly, which comprises the impeller main body, the shroud that covers the blade parts, and a filler material, which is disposed between the blade parts and the a core layer of the shroud; and brazing the assembly in an inert gas without using flux.

As described above, in the situation in which brazing is performed using flux, gas is sometimes produced by a reaction between the flux and the oxide film present on the surface of the aluminum material. When the molten filler solidifies with this gas dissolved as is in the molten filler, there is a risk that voids will be formed inside the brazed joint. In contrast, as described above, in the situation in which the impeller main body and the shroud are joined by the flux-free-brazing method, that is, by a method in which brazing is performed in an inert gas without using flux, the generation of gas originating from the flux can be avoided. Accordingly, by joining the impeller main body and the shroud using a flux-free-brazing method, the occurrence of voids in the brazed joint can be curtailed, and thereby the functions and effects of increasing the joint strength can be achieved.

The invention claimed is:

1. A closed impeller comprising:
   an impeller main body, which is composed of an aluminum alloy and comprises a hub part and blade parts that protrude from the hub part;
   a shroud, which covers the blade parts; and
   brazed joints, which are interposed between the blade parts and the shroud and join the blade parts and the shroud;
   wherein the shroud is a brazing sheet that comprises a core material, which is composed of an aluminum alloy, and a filler material, which is disposed on the core material and is present on an outermost surface on a side opposing the blade parts.

2. The closed impeller according to claim 1, wherein the joint strength of the brazed joints is 150 MPa or higher.

3. The closed impeller according to claim 2, wherein the brazed joints have a joint strength of 150 MPa or higher.

4. The closed impeller according to claim 3, wherein the aluminum alloy of the impeller main body is a 6000-series aluminum alloy or a 7000-series aluminum alloy.

5. The closed impeller according to claim 4, wherein the aluminum alloy of the core material is a 6000-series aluminum alloy or a 7000-series aluminum alloy.

6. The closed impeller according to claim 5, wherein:
   the aluminum alloy of the core material contains Mg: 0.20 mass % or more and less than 1.80 mass %, and
   the filler material contains Si: 6 mass % or more and 13 mass % or less.

7. The closed impeller according to claim 6, wherein:
   the blade parts have a helical shape in plan view, and
   the shroud has a funnel shape.

8. The closed impeller according to claim 7, wherein the filler material contains Bi:
   0.0050 mass % or more and less than 0.060 mass %.

9. The closed impeller according to claim 1 or 2, wherein the brazed joints comprise the filler material, which is composed of an aluminum alloy that contains Mg: 0.25 mass % or more.

10. A method of manufacturing the closed impeller according to claim 1, comprising:
    preparing the impeller main body;
    preparing the brazing sheet, which comprises: the core material, which is composed of an aluminum alloy that contains Mg: 0.20 mass % or more and less than 1.80 mass %; and a filler-material layer, which is composed of an Al—Si-series alloy, has a thickness of 20-215 μm, and is disposed on the outermost surface;
    preparing the shroud by performing forming work on the brazing sheet and disposing the filler-material layer on a surface opposing the blade parts; and
    brazing the surface of the shroud opposing the blade parts and the blade parts of the impeller main body in an inert gas without using flux.

11. The method of manufacturing the closed impeller according to claim 10, wherein:
    the brazing sheet comprises the core material, which is composed of an aluminum alloy that contains Mg: 0.30 mass % or more and less than 1.80 mass %, and the filler-material layer, which is layered on the core material, and
    a thickness X [μm] of the filler-material layer and an Mg amount Y [mass %] in the core material satisfy either Equation (1) below or Equation (2) below:

$Y \geq X/120$ (provided that $X \geq 36$)     (1) or $Y \geq 0.30$ (provided that $X < 36$)     (2).

12. The method of manufacturing the closed impeller according to claim 10, wherein the brazing sheet further comprises an intermediate material, which is composed of an aluminum alloy that contains Mg: 0.80 mass % or more and less than 6.50 mass % and is interposed between the core material and the filler-material layer.

13. The method of manufacturing the closed impeller according to claim 12, wherein the intermediate material further contains Si: 2.0 mass % or more and 13.0 mass % or less.

14. The method of manufacturing the closed impeller according to claim 4, wherein the filler-material layer further contains Bi: 0.0050 mass % or more and less than 0.060 mass %.

15. The method of manufacturing the closed impeller according to claim 4, wherein the brazing is performed by heating the shroud and the impeller main body in a state in which pressure due to the inert gas is controlled to within a range of 1-110,000 Pa.

16. The method of manufacturing the closed impeller according to claim 4, wherein after the brazing has been performed, a solution treatment is performed on the closed impeller, and then an artificial-aging treatment is performed on the closed impeller.

17. A closed impeller comprising:
    an impeller main body, which is composed of an aluminum material and comprises a hub part and blade parts that protrude from the hub part;
    a shroud, which is composed of an aluminum material and covers the blade parts; and
    brazed joints, which are interposed between the blade parts and the shroud and join the blade parts and the shroud;
    wherein the brazed joints comprise a filler material, which is composed of an aluminum alloy that contains Mg: 0.25 mass % or more.

18. A method of manufacturing a closed impeller comprising: an impeller main body, which is composed of an aluminum material and comprises a hub part and blade parts that protrude from the hub part; a shroud, which is composed of an aluminum material and covers the blade parts; and brazed joints, which are interposed between the blade parts and the shroud and join the blade parts and the shroud, the method comprising:
    preparing an assembly, which comprises the impeller main body, the shroud that covers the blade parts, and a filler material, which is disposed between the blade parts and the shroud; and
    brazing the assembly in an inert gas without using flux.

* * * * *